US011431492B2

(12) United States Patent
Soryal (10) Patent No.: US 11,431,492 B2
(45) Date of Patent: Aug. 30, 2022

(54) MUTABLE ENCRYPTED SYSTEM

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 83 days.

(21) Appl. No.: 16/911,562

(22) Filed: Jun. 25, 2020

(65) Prior Publication Data

US 2021/0409203 A1 Dec. 30, 2021

(51) Int. Cl.
*H04L 9/08* (2006.01)
*G06F 21/75* (2013.01)

(52) U.S. Cl.
CPC .......... *H04L 9/0863* (2013.01); *G06F 21/75* (2013.01); *H04L 9/0822* (2013.01); *G06F 2221/0755* (2013.01); *G06F 2221/2113* (2013.01); *G06F 2221/2137* (2013.01); *G06F 2221/2147* (2013.01)

(58) Field of Classification Search
CPC ....... H04L 9/0863; H04L 9/0822; H04L 9/08; G06F 21/75; G06F 2221/2137; G06F 2221/0755; G06F 2221/2147; G06F 2221/2113
See application file for complete search history.

(56) References Cited

U.S. PATENT DOCUMENTS

| | | | |
|---|---|---|---|
| 9,467,443 B2* | 10/2016 | Mohan | H04L 63/0846 |
| 2012/0030731 A1* | 2/2012 | Bhargava | G06F 21/566 |
| | | | 726/3 |
| 2017/0230179 A1* | 8/2017 | Mannan | H04L 9/3247 |
| 2018/0110007 A1* | 4/2018 | Park | H04W 52/0232 |
| 2019/0163883 A1* | 5/2019 | Savanah | G06F 21/105 |

* cited by examiner

*Primary Examiner* — Quazi Farooqui
(74) *Attorney, Agent, or Firm* — Guntin & Gust, PLC; Dana Lemoine (57) ABSTRACT

Security of network traffic may be increased by utilizing a mutable password to encrypt and decrypt content stored inside an executable utilizing a mutable password (e.g., where a password changes based on an equation when the executable is run). For example, the present password may be associated with a variable, the variable may be modified when the executable is run using the present password, and a subsequent password may be generated based on the modified variable.

20 Claims, 5 Drawing Sheets

MUTABLE ENCRYPTED SYSTEM

BACKGROUND

As network traffic including encrypted data passes thru unknown or uncontrolled networks, it is difficult to know if an adversary intercepts and decrypts one or more packets (e.g., transmitted data between two hosts) using stolen keys and resends the packets on their way. For example, some existing technology may check for a delay in the transmission and receipt of the encrypted data. However, such existing technologies may be expensive and inaccurate. Moreover, it may also be challenging to protect one or more files, such as a stored encrypted file (e.g., data at rest). For example, it may be difficult for a rightful owner of encrypted data to know if the data has been opened by someone else, e.g., who obtained a password to open the encrypted data.

This background information is provided to reveal information believed by the applicant to be of possible relevance. No admission is necessarily intended, nor should be construed, that any of the preceding information constitutes prior art.

SUMMARY

Disclosed herein are devices, systems, and methods for encrypting and decrypting content stored inside an executable utilizing a mutable password (e.g., password changes based on an equation when the executable is run). In an example, the content stored inside the executable may be encrypted and a present password may be required to run the executable (e.g., decrypt the encrypted content).

In some examples, the present password may be associated with a variable (e.g., the X value in a complex polynomial equation, such as $\{X^{21}+X^{15}+X^{8}+X^{2}=Y\}$) and the variable may be modified when the executable is run using the present password. Moreover, a subsequent password may be generated based on the modified variable and thus, the subsequent password may be different from the present password. For example, the present password may be transmitted to a decryption manager, the decryption manager may provide a decryption key based on the present password, and the content stored inside the executable may be deleted based on the decryption key.

In some examples, details associated with the opening transaction (e.g., user, date, time, system information, etc.) may be logged inside the executable. Furthermore, in some examples, an action may be taken (e.g., deleting the content, notifying parties, etc.) based on the receipt of an incorrect password.

In some examples, a ledger is stored inside the content or the executable. For example, the ledger may include the present password, the equation, the modified variable, or the subsequent password (e.g., chained in a single ledger embedded inside the package). Moreover, the content or the executable may be encrypted using the subsequent password, where the subsequent password is required to run the executable. In some examples, generating the subsequent password includes generating an encryption key and the executable and the encryption key may be used to encrypt the executable. In some examples, a copy of the ledger may be stored at an encryption manager, e.g., separately from the content.

In accordance with some examples, a computer readable storage medium has stored therein instructions that are computer executable to perform or cause performance of any of the methods described herein. In accordance with some examples, a device includes one or more processors, a memory, and one or more programs; the one or more programs are stored in the memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The disclosed subject matter may encrypt and decrypt content stored inside an executable utilizing a mutable password. The password may change each time the executable is executed, e.g., each time the content is decrypted.

Figure 1:
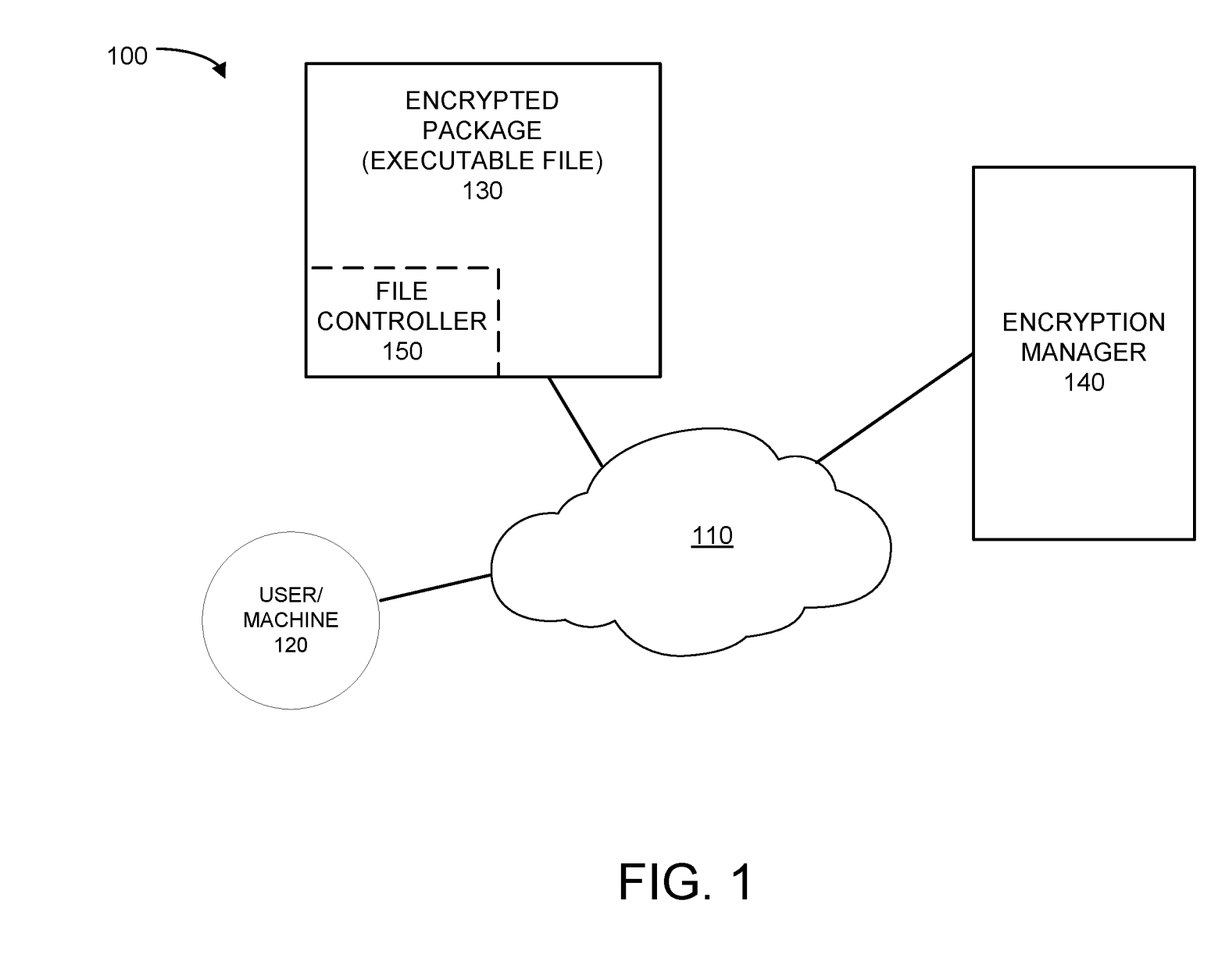
FIG. 1 illustrates an exemplary system architecture for encrypting and decrypting content stored inside an executable utilizing a mutable password, among other things.

FIG. 1 illustrates an exemplary system architecture 100 for encrypting/decrypting content stored inside an executable utilizing a mutable password, among other things. System architecture 100 may include network 110, user equipment (UE) 120 (e.g., a mobile device, device, base station, server, etc.), encrypted package (e.g., executable file) 130, Encryption Manager 140, or File Controller 150.

In an example, one or more encrypted files are stored inside encrypted package 130 (e.g., an executable file). For example, a password may be required to run the executable to open the encrypted package 130 for unencrypted content (e.g. plain text).

In an example, the password required to run the executable changes every time the executable is run. For example, an encryption decryption key may be the X value in a complex polynomial equation (e.g., $X^{21}+X^{15}+X^{8}+X^{2}=Y$). Moreover, the encrypted file or the decryptor may have a sequence of values for Y (e.g., $\{Y1, Y2, Y3, \ldots Yn\}$). Thus, the decryptor may provide Yn and the system may calculate the correspondent X value to use as a key. Along similar lines, when the encrypted package 130 is opened by the solution corresponding to Y1, then the next key to be used would be Y2, and so on and so forth. For example, when the encrypted package 130 gets opened by Y1, it may set the executable package to the result of Y2 to open the encrypted package 130.

In some examples, the opening transaction gets logged inside the encrypted package 130. For example, all previous opening transactions may be chained in a single ledger embedded inside the encrypted package 130. In some examples, there may be an Encryption Manager 140 running on the device or online that has a copy of a distributed ledger, e.g., the copy of the distributed ledger may be used as a form of second-factor authentication. For example, the Encryption Manger 140 may receive the distributed ledger after UE 120 inserts a Y value and in return may provide a File Controller 150 with a piece of the equation to open the encrypted package 130. Moreover, the Encryption Manager 140 may manage many files or users and may function as a second layer of security In some examples, a host (e.g., a terminal that will decrypt the encrypted package 130) must have access to the Encryption Manager 140 in order to decrypt encrypted package 130. In some examples, the Encryption Manager 140 may be a software application that does not permit changes by external entities (e.g., an anti-tamper or protected application). For example, if there are hacking attempts to the Encryption Manager 140, it may generate an alarm to the user via a pre-configured message (e.g., email or text) and the Encryption Manager 140 may be configured to discard the information stored inside of the Encryption Manager 140. Moreover, the Encryption Manager 140 may reside locally (e.g., stored on a computer or computing device) or may reside remotely (e.g., stored on a third party server, cloud, etc.).

In some examples, all transactions to the encrypted package 130 may be embedded in the distributed ledger (e.g., a blockchain). For example, the distributed ledger may include information such as an operating system user name associated with a user who decrypted the encrypted package 130, a time of decryption, whether an encrypted file was copied to another system (e.g., read into a different memory segment) and by whom and at what time, or host machine specifications (e.g., regarding hardware type, operating system, etc.). Moreover, the Encryption Manager 140 and the encrypted package 130 may have the same copy of the distributed ledger. For example, if the blockchain received by the Encryption Manager 140 does not match the blockchain of the encrypted package 130, the Encryption Manager 140 may send a security notification, e.g., an alarm sent to a preconfigured email, text, system, etc.

In some examples, information (e.g., IP address, file location, etc.) for the Encryption Manager 140 may be embedded in a file controller segment (e.g., File Controller 150) when a file or packet is packaged as an executable (e.g., encrypted package 130). Therefore, the encrypted package 130 may reach out to the File Controller 150 later. In some examples, the File Controller 150 may be a local file manager inside the encrypted package 130, e.g., where the encrypted data is the payload and the file controller segment is the header or controller. For example, the Encryption Manager 140 may not open the payload if the File Controller 150 does not communicate with the Encryption Manager 140.

In some examples, the content gets changed every time the decryption process takes place. Moreover, the encrypted package may be an executable file and a correct decryption key may be required for the .exe to run. In some examples, multiple types of actions may occur upon decryption (e.g., running the executable). For example, content may get destroyed if opened with a wrong password or after a first READ operation. Moreover, a second password may be needed to reopen the package again and the opening transaction may be logged inside the package. In some examples, the encrypted package 130 may be used in the beginning of a communication or periodically, e.g., the encrypted package 130 may not need to be implemented for the entirety of the data stream.

In some examples, the key used to encrypt the encrypted package 130 must be the same key used to decrypt the encrypted package 130. For example, in a single session (e.g., Session N), the system may use Y1 to decrypt the encrypted package 130 and access a file. At the end of the session, when the file is encrypted, the system may use Y2 to encrypt the encrypted package 130, which will be the decrypting key for the next time the encrypted package 130 is opened. As an example, the system may use Y+1 to decrypt the encrypted package 130 in a Session N+1.

In some examples, two sets of keys may be used for encryption and decryption, e.g., one mutable key and one key from the Encryption Manager 140, such that both keys are used to lock or unlock contents of the encrypted package 130. For example, the system may receive a selection from a user to encrypt a file (e.g., a click on a button associated with the file) and the File Controller 150 may encrypt the file with the next session's key. The File Controller 150 may also communicate any transaction information with the Encryption Manager 140. The Encryption Manager 140 may communicate back to the File Controller 150 and provide the File Controller 150 with a new key (e.g., Encryption_Manager_ KEY) to encrypt the already encrypted file by the new key. Thus, the Encryption Manager 140 may use the new key (e.g., Encryption_Manager_KEY) the next time the file is decrypted.

In some examples, when the system receives the next key (e.g., new Y value) to decrypt the encrypted package 130, the File Controller 150 may temporarily store the next key. Moreover, the File Controller 150 may communicate with the Encryption Manger 140 to decrypt the content for the first decryption process and may use the temporarily stored key for a second round of decryption. In some examples, the File Controller 150 may submit (e.g., in the background) its blockchain (e.g., containing all the previous transactions) to the Encryption Manager 140 when the File Controller 150 connects with the Encryption Manager 140. If the blockchain for all the previous transactions sent by the File Controller 150 matches the copy residing in the Encryption Manager 140, then the Encryption Manager may send a key (e.g., Encryption_Manager_KEY) to the File Controller 150. Thus, the File Controller 150 does not store the Encryption_Manager_KEY. Furthermore, the transactions included in the blockchain may be hashed so the compared number of bits are small.

Figure 2:
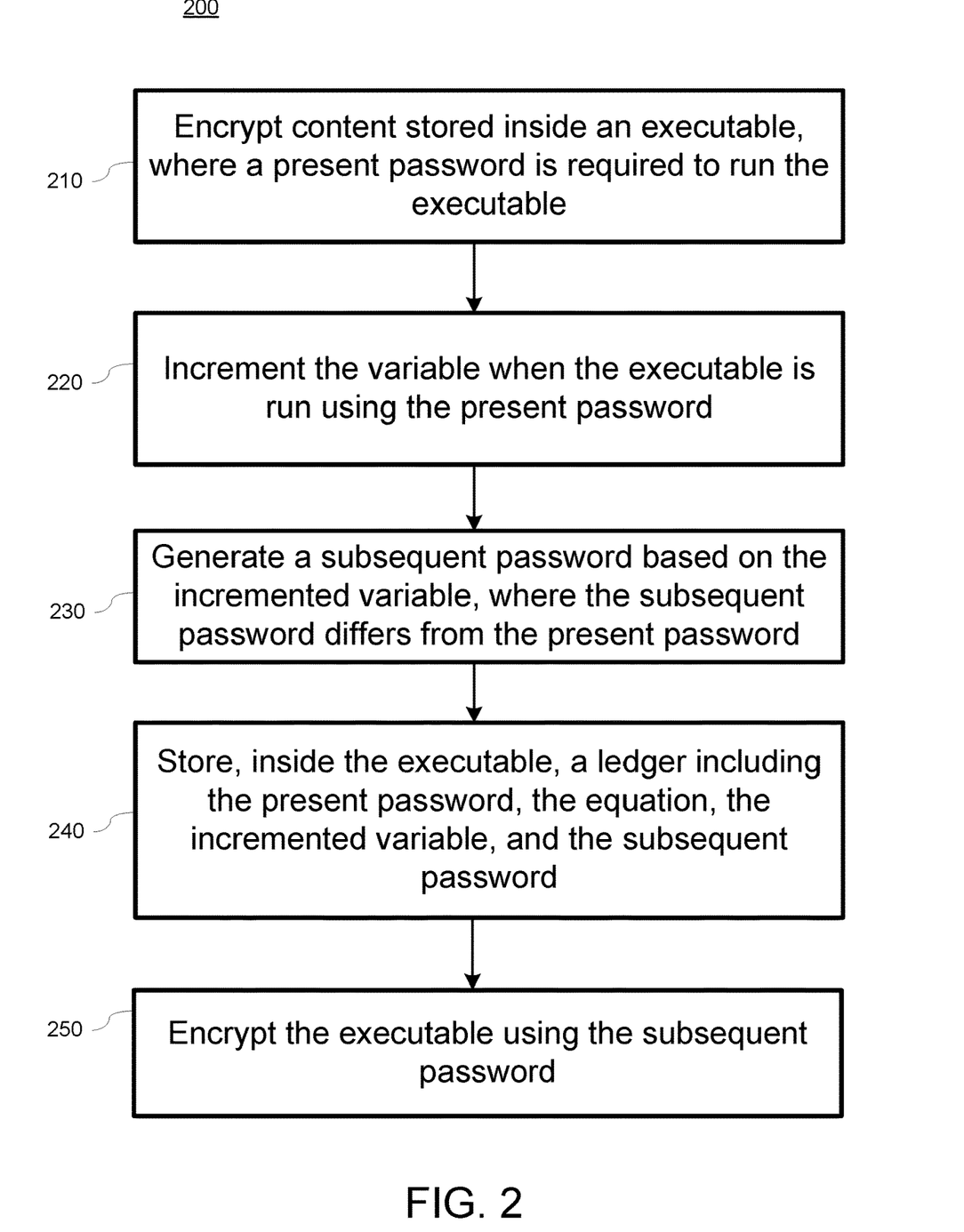
FIG. 2 illustrates an exemplary method for encrypting and decrypting content stored inside an executable utilizing a mutable password.

FIG. 2 illustrates an exemplary method 200 for encrypting/decrypting content stored inside an executable (e.g., encrypted package 130) utilizing a mutable password, including tracking an encrypted file at rest (e.g., stored) that was previously opened. For example, a mutable password may change based on an equation when the executable is run. In some examples, the method 200 is performed by a device or machine (e.g., UE 120). Moreover, the method 200 may be performed at a network device, desktop, laptop, mobile device, server device, or by multiple devices in communication with one another. In some examples, the method 200 is performed by processing logic, including hardware, firmware, software, or a combination thereof. In some examples, the method 200 is performed by a processor executing code stored in a computer-readable medium (e.g., a memory).

At block 210, the method 200 encrypts content stored inside an executable (e.g., encrypted package 130), where a present password is required to run the executable and the present password is associated with a variable. For example, the present password may be used to decrypt the encrypted content. In some examples, the present password is based on an equation, e.g., the X value in a complex polynomial equation, such as $\{X^{21}+X^{15}+X^8+X^2=Y\}$.

At block 220, the method 200 modifies the variable when the executable (e.g., encrypted package 130) is run using the present password. For example, a user could run the executable using the present password and then an X value in a complex polynomial equation may be incremented (e.g., change by a constant or variable degree).

At block 230, the method 200 generates a subsequent password based on the modified variable of block 220, wherein the subsequent password differs from the present password. For example, the subsequent password may be a Y or second variable in a same or different complex polynomial equation.

At block 240, the method 200 stores a ledger including information associated with the opening transaction, the present password, the equation, the modified variable, or the subsequent password. For example, the ledger may be chained in a single ledger embedded inside the package. Moreover, a copy of the ledger may be stored at an encryption manager (e.g., encryption manager 140), where the encryption manager is local or remote from the encrypted content or executable.

At block 250, the method 200 encrypts the content using the subsequent password. Thus, the password changes each time the executable is run using a given password.

Examples of the methods disclosed herein may be performed in the operation of such computing devices. The order of the blocks presented in the examples herein can be varied. For example, blocks can be re-ordered, combined, or broken into sub-blocks. Certain blocks or processes can be performed in parallel.

Figure 3:
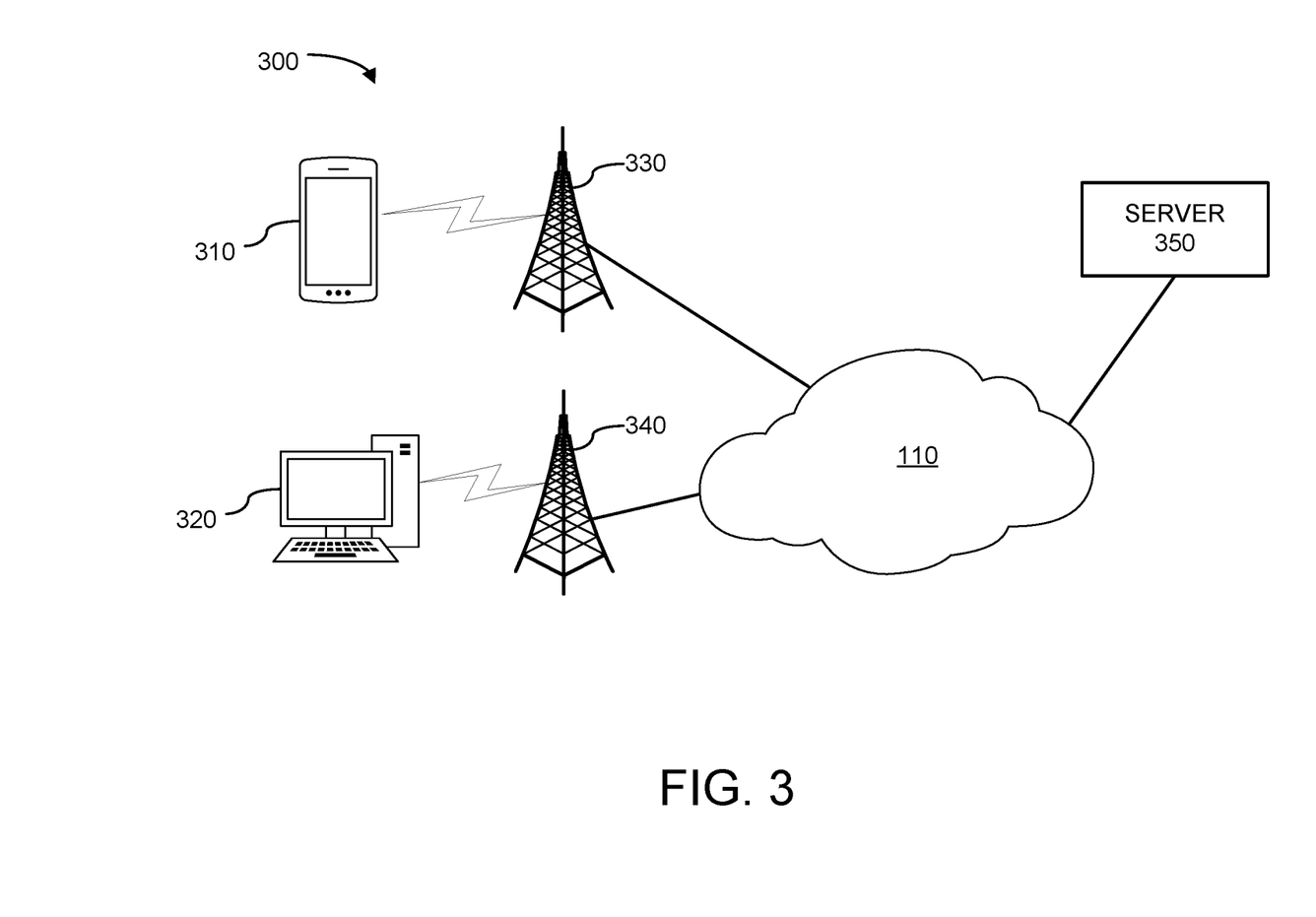
FIG. 3 illustrates an exemplary system that may implement the subject matter disclosed herein, such as encrypting and decrypting content stored inside an executable utilizing a mutable password, among other things.

FIG. 3 illustrates an exemplary system 300 that may implement the subject matter disclosed herein, such as encrypting or decrypting content stored inside an executable utilizing a mutable password, among other things. System 300 may include network 110. Network 110 may communicate with or otherwise connect mobile device 310, device 320, base station 330, base station 340, or server 350. The devices of system 300 may be communicatively connected with each other. Mobile device 310 may include a laptop, desktop computer, tablet, autonomous vehicle (e.g., SAE Intl level 3 to level 5 automation), or mobile phone, among other things. Device 320 may include wireless or wired devices, such as servers, routers, switches, desktop computers, or the like. Each device can also comprise a memory operatively coupled to a processor. The memory can store protocols associated with encrypting or decrypting content (referred to herein as encrypting/decrypting content) as discussed herein. In an example, mobile device 310, device 320, or server 350 may process some or all of the steps of FIG. 2 or FIG. 4, herein.

With continued reference to FIG. 3, in an example, the content stored inside the executable and encrypted/decrypted (e.g., by mobile device 310, device 320, or server 350) may include virtually any kind of file format, including video, audio, and image formats. Moreover, the content stored inside the executable may include any number of files of size. For example, file types may include MP4, AVI, MKV, WMV, MTS, RMVB, MXF, VOB, FLV, MPEG, TS, MP3, AAC, AC3, OGG, WMA, JPG, BMP, PNG, etc. Mobile device 310, device 320, and server 350 may obtain information from multiple sources. For example, the information of server 350 may include information from mobile device 310, device 320, base station 330, base station 340, or the like.

Figure 4:
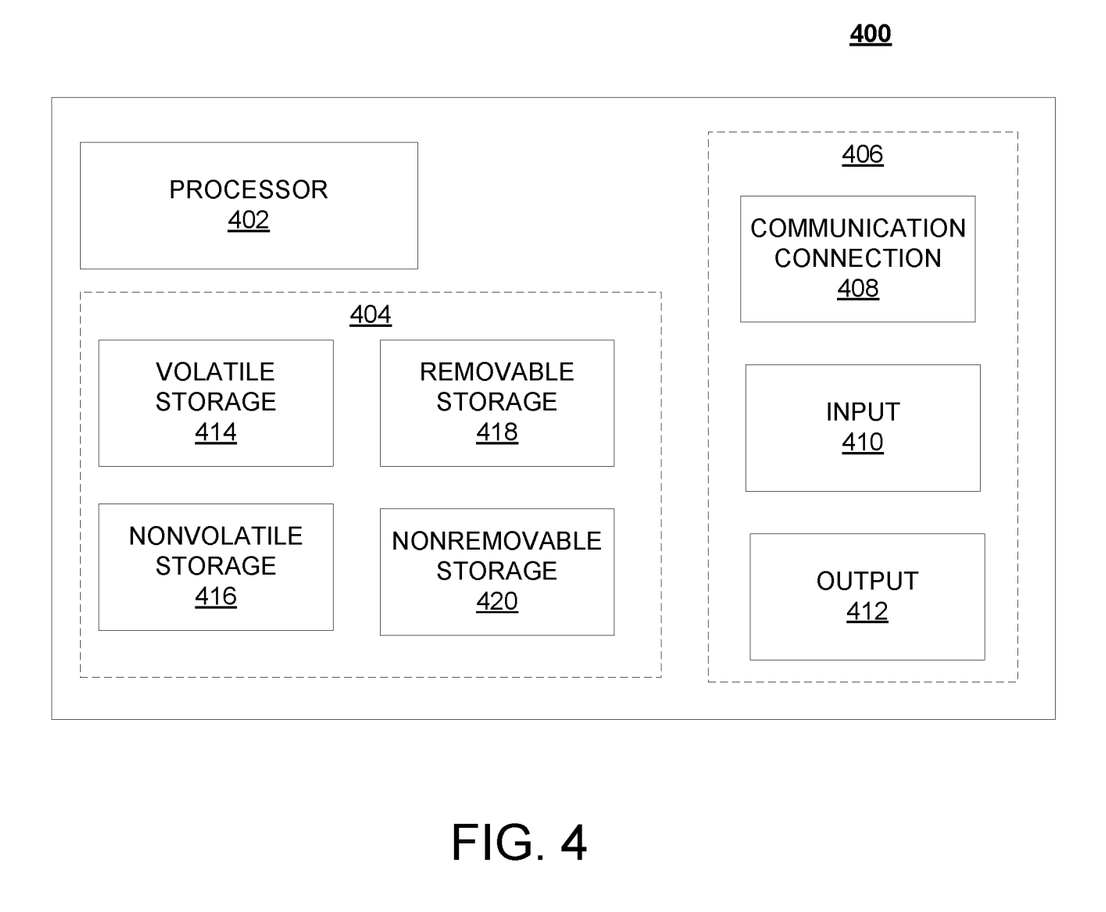
FIG. 4 illustrates a schematic of an exemplary network device.

FIG. 4 is a block diagram of network device 400 that may be connected to or comprise a component of communication system 300. Network device 400 may comprise hardware or a combination of hardware and software. The functionality to facilitate telecommunications via a telecommunications network may reside in one or a combination of network devices 400. Network device 400 depicted in FIG. 4 may represent or perform functionality of an appropriate network device 400, or a combination of network devices 400, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW) 430, a packet data network (PDN) gateway, an RAN, a serving mobile location center (SMLC), or the like, or any appropriate combination thereof. It is emphasized that the block diagram depicted in FIG. 4 is exemplary and not intended to imply a limitation to a specific example or configuration. Thus, network device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, network device 400 is not to be construed as software per se.

In addition to processor 402 and memory 404, network device 400 may include an input/output system 406. Processor 402, memory 404, and input/output system 406 may be coupled together (coupling not shown in FIG. 4) to allow communications between them. Each portion of network device 400 may comprise circuitry for performing functions associated with each respective portion. Thus, each portion may comprise hardware, or a combination of hardware and software. Accordingly, each portion of network device 400 is not to be construed as software per se. Input/output system 406 may be capable of receiving or providing information from or to a communications device or other network entities configured for telecommunications. For example, input/output system 406 may include a wireless communications (e.g., 3G/4G/5G/GPS) card. Input/output system 406 may be capable of receiving or sending video information, audio information, control information, image information, data, or any combination thereof. Input/output system 406 may be capable of transferring information with network device 400. In various configurations, input/output system 406 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network device 400 also may contain a communication connection 408 that allows network device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network device 400, determining a type of broadcast message and acting according to the broadcast message type or content, as described herein.

Memory 404 of network device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a non-removable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 400. Memory 404 may comprise executable instructions that, when executed by processor 402, cause processor 402 to effectuate operations to map signal strengths in an area of interest.

Figure 5:
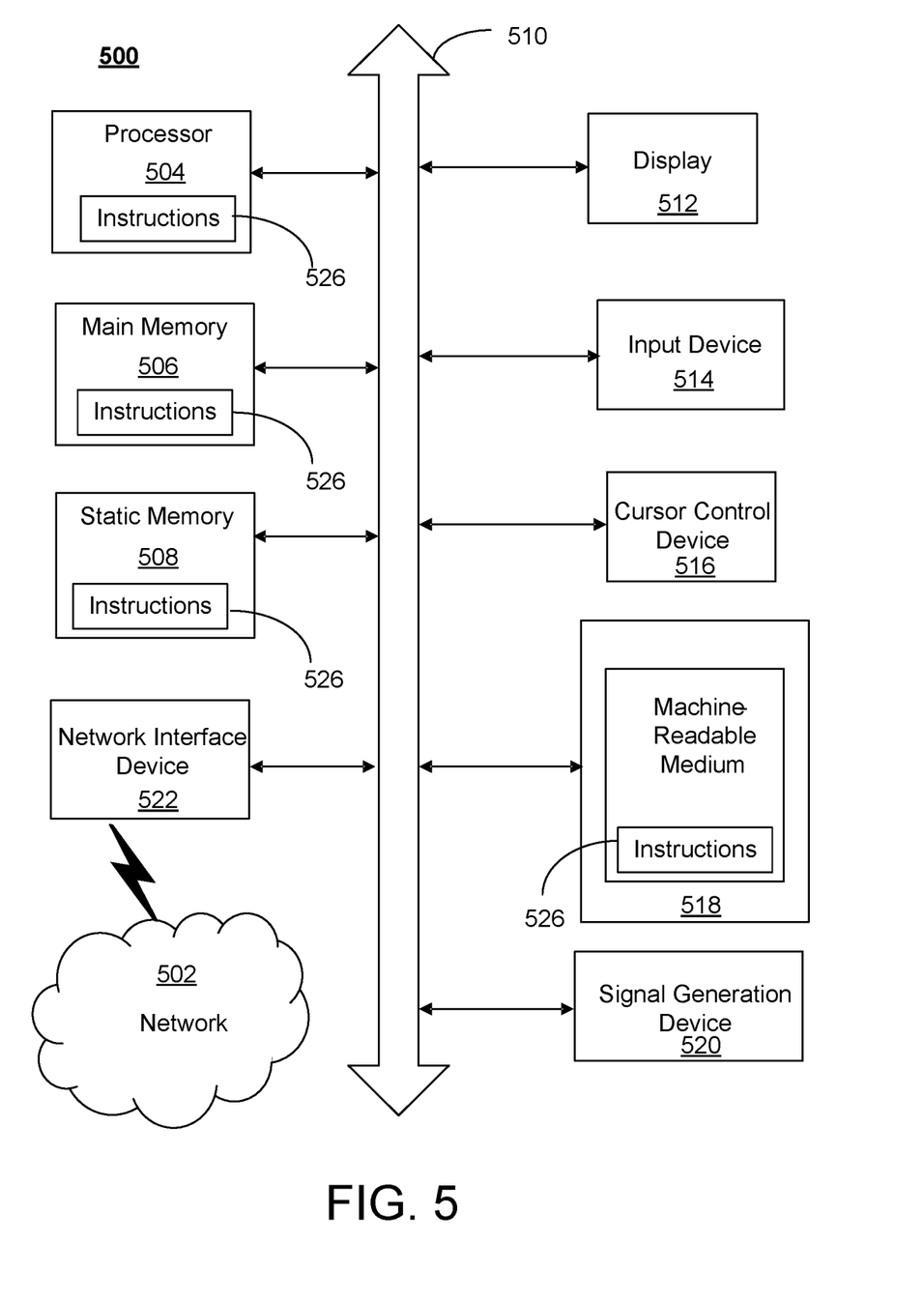
FIG. 5 illustrates an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 402, mobile device 310, device 320, base station 330, base station 340, and other devices of FIG. 1, FIG. 2, FIG. 3, and FIG. 4. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., instructions 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple Internet Protocol (IP) may be based, at least in part, on user equipment, that provide a wireless management and control framework that enables common wireless management and control, such as mobility management, radio resource management, Quality of Service (QoS), load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improving customer experience; or improving user equipment power efficiency and battery life—especially for simple machine to machine (M2M) devices—through enhanced wireless management.

While examples of a system for encrypting/decrypting content stored inside an executable utilizing a mutable password have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing telecommunications as described herein. When implemented on a general purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—encrypting/decrypting content stored inside an executable utilizing a mutable password—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. A method of encrypting and decrypting content stored inside an executable utilizing a mutable password, the method comprising:
    encrypting, by a processor, the content stored inside the executable, wherein a present password is required to run the executable and the present password is associated with a variable in a mathematical equation;
    modifying, by the processor, the variable when the executable is run using the present password;
    generating, by the processor, a subsequent password based on the modified variable, wherein the subsequent password differs from the present password;
    storing, by the processor inside the executable, a ledger including the present password, the mathematical equation, the modified variable, and the subsequent password; and
    encrypting, by the processor, the executable using the subsequent password, wherein the generating the subsequent password includes generating an encryption key and encrypting the executable using the subsequent password is based on the encryption key.

2. The method of claim 1, further comprising logging, by the processor, at least one detail associated with running the executable inside the executable.

3. The method of claim 1, wherein the mathematical equation is a complex polynomial equation.

4. The method of claim 1, wherein the variable is modified based on a complex polynomial equation.

5. The method of claim 1, further comprising:
    receiving, by the processor, an incorrect password to run the executable; and
    deleting, by the processor, the content based on the receiving of the incorrect password.

6. The method of claim 1, further comprising storing a copy of the ledger at an encryption manager separately from the content.

7. The method of claim 1, further comprising:
    transmitting, by the processor, the present password to a decryption manager;
    receiving, from the decryption manager, a decryption key based on the present password; and
    decrypting, by the processor based on the decryption key, the content stored inside the executable.

8. A system for encrypting and decrypting content stored inside an executable utilizing a mutable password (e.g., changes based on an equation when the executable is run), the system comprising:
    a processor; and
    a memory including instructions that, when executed by the processor, cause the system to:
    encrypt the content stored inside the executable, wherein a present password is required to run the executable and the present password is associated with a variable in a mathematical equation;
    modify the variable when the executable is run using the present password;

generate a subsequent password based on the modified variable, wherein the subsequent password differs from the present password;

store by the processor inside the executable, a ledger including the present password, the mathematical equation, the modified variable, and the subsequent password; and encrypt the executable using the subsequent password, wherein the generating the subsequent password includes generating an encryption key and encrypting the executable using the subsequent password is based on the encryption key.

9. The system of claim 8, wherein the instructions are further configured to cause the system to log at least one detail associated with running the executable inside the executable.

10. The system of claim 8, wherein the mathematical equation is a complex polynomial equation.

11. The system of claim 8, wherein the variable is modified based on a complex polynomial equation.

12. The system of claim 8, wherein the instructions are further configured to cause the system to:

receive an incorrect password to run the executable; and delete at least a portion of the executable based on the receipt of the incorrect password.

13. The system of claim 8, wherein the instructions are further configured to cause the system to store a copy of the ledger at an encryption manager separately from the executable.

14. The system of claim 8, wherein the instructions are further configured to cause the system to:

transmit the present password to a decryption manager;

receive, from the decryption manager, a decryption key based on the present password; and decrypt, based on the decryption key, content stored inside the executable.

15. A computer program product for encrypting and decrypting content stored inside an executable utilizing a mutable password (e.g., changes based on an equation when the executable is run), the computer program product comprising:

a computer-readable storage medium; and instructions stored on the computer-readable storage medium that, when executed by a processor, causes the processor to:

encrypt the content stored inside the executable, wherein a present password is required to run the executable and the present password is associated with a variable in a mathematical equation;

modify the variable when the executable is run using the present password;

generate a subsequent password based on the modified variable, wherein the subsequent password differs from the present password;

store by the processor inside the executable, a ledger including the present password, the mathematical equation, the modified variable, and the subsequent password; and encrypt the executable using the subsequent password, wherein the generating the subsequent password includes generating an encryption key and encrypting the executable using the subsequent password is based on the encryption key.

16. The computer program product of claim 15, wherein the instructions are further configured to cause the processor to log at least one detail associated with running the executable inside the executable.

17. The computer program product of claim 15, wherein the mathematical equation is a complex polynomial equation.

18. The computer program product of claim 15, wherein the instructions are further configured to cause the processor to:

receive an incorrect password to run the executable; and delete at least a portion of the executable based on receipt of the incorrect password.

19. The computer program product of claim 15, wherein the instructions are further configured to cause the processor to store a copy of the ledger at an encryption manager separately from the executable.

20. The computer program product of claim 15, wherein the instructions are further configured to cause the processor to:

transmit the present password to a decryption manager;

receive, from the decryption manager, a decryption key based on the present password; and decrypt, based on the decryption key, content stored inside the executable.

* * * * *